Nov. 19, 1940.  O. E. SANDSTROM  2,222,243
PORTABLE HOISTING JACK
Filed March 20, 1940  2 Sheets-Sheet 2
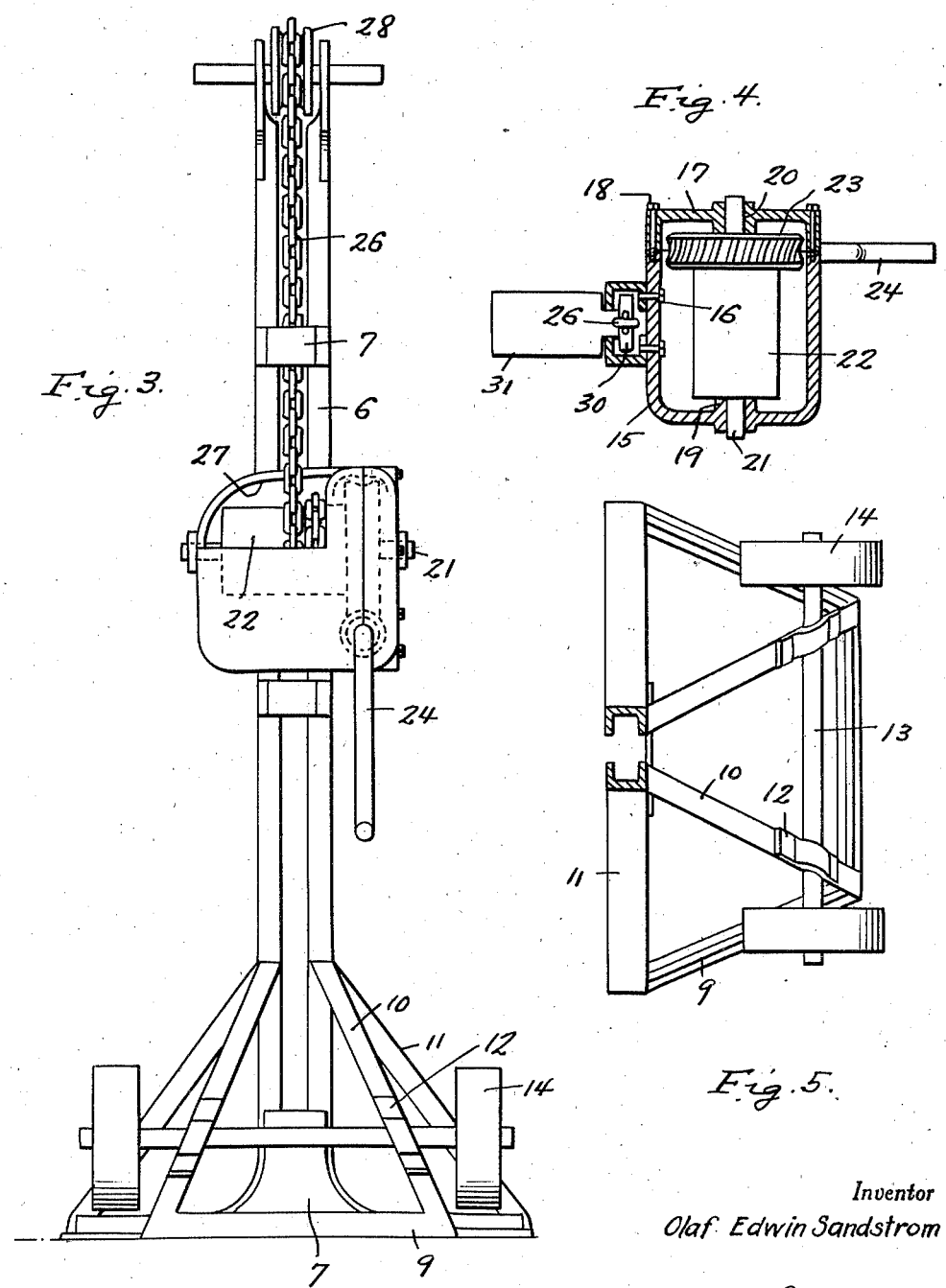
Inventor
Olaf Edwin Sandstrom
By Clarence A. O'Brien
Attorneys Patented Nov. 19, 1940

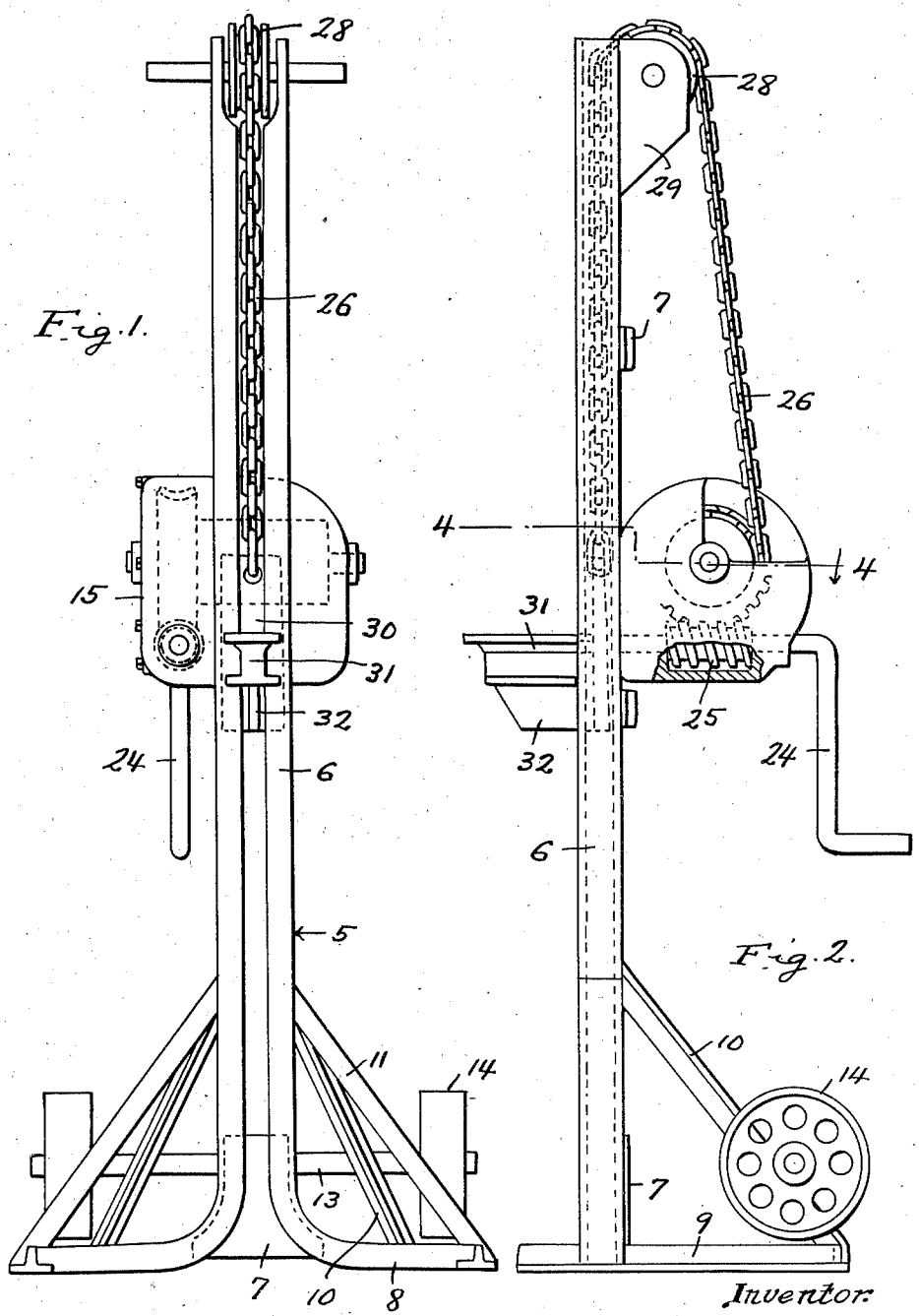

2,222,243

UNITED STATES PATENT OFFICE 2,222,243

PORTABLE HOISTING JACK

Olaf Edwin Sandstrom, Sioux Falls, S. Dak.

Application March 20, 1940, Serial No. 325,047

2 Claims. (Cl. 254—139.1)

The present invention relates to jacks of a type adapted to hoist heavy machinery, and other objects, where the object occupies or is desired to be moved a substantial distance above the ground, or to load and unload truck bodies, and for similar purposes, and has for its primary object to provide an upstanding frame on which the hoisting platform is slidably mounted and providing a flexible hoisting connection between the platform and a gear operated drum to raise the platform into the desired position.

A still further object is to provide a supporting base for the frame having wheels mounted thereon normally in a position out of engagement with the ground when the frame is in an upright position, the wheels being adapted for movement into engagement with the ground by a tilting action of the frame whereby to enable the jack to be moved into the desired position for engaging the object to be hoisted.

A still further object is to provide an apparatus of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a front elevational view.

Figure 2 is a side elevational view.

Figure 3 is a rear elevational view.

Figure 4 is a transverse sectional view taken substantially on a line 4—4 of Figure 2, and Figure 5 is a top plan view of the base and with the upstanding frame members shown in section.

Referring now to the drawings in detail, the numeral 5 designates an upstanding frame generally which is composed of a pair of spaced parallel channel irons 6 having their channels arranged in opposed relation as shown more clearly in Figures 4 and 5 of the drawings, the frames being secured in spaced relation by spacing members 7. The lower ends of the frame members 6 are curved outwardly in opposite directions to provide horizontal supporting feet 8, the outer end portions of which are welded or otherwise permanently secured to a substantially U-shaped base 9 which projects horizontally rearwardly from the upstanding frame members 6 and is connected thereto by brace members 10 which extend from the bight portion of the base to the rear edge of the frame members. Side brace members 11 also extend from the side edges of the respective frame members 6 to the end portions of the U-shaped base 9.

The spacing members 7, braces 10 and 11 as well as the base 9 are welded or otherwise permanently secured to their respective connected parts.

Also similarly secured to the brace members 10 are brackets 12 fixedly securing an axle 13 to the brace members and on the ends of the axle are journalled wheels 14, the wheels normally being maintained in an elevated position out of contact with the ground when the frame is supported in an upright position as shown more clearly in Figure 2 of the drawings. However, as more clearly shown in Figures 2 and 5 of the drawings, the rear edge of the wheels project beyond the rear end of the frame 9 so that when the frame is tilted rearwardly the wheels will engage the ground to facilitate transporting of the hoist to the desired position for engaging the work.

A combined drum and gear housing 15 is secured to the frame members 6 by means of bolts or the like 16, the housing being provided with a removable end plate 17 secured in position by bolts 18. Bearing bosses 19 and 20 are formed in the closed end of the housing as well as in the cover plate 17, respectively, and in which are journalled the ends of a shaft 21, the shaft being formed with a drum 22 and a worm gear 23 at the end thereof adjacent the cover plate 17 as more clearly shown in Figure 4 of the drawings.

A crank arm 24 has one end projecting into and journalled in the housing 15 and on the inner end of the crank arm is secured a worm 25 engaging with the worm gear 23 whereby to provide for the rotation of the drum 22. A chain, cable, or other flexible member 26 has one end secured to the drum and extends outwardly through an opening 27 in the housing and upwardly over a pulley 28 journalled in brackets 29 suitably secured at the rear upper ends of the frame members 6, the chain then extending downwardly between the frame members and has its other end secured to a carrier 30 slidably mounted in the channels of the frame members 6.

Projecting horizontally from the carrier 30 and extending outwardly between the spaced edges of the frame members 6, is a work-engaging platform 31, the platform, at its under side, being provided with a bracing web 32 welded or otherwise secured to the lower portion of the carrier 30.

In the operation of the device it will be apparent that the hoist may be tilted backwardly upon the wheels 14 whereby to move the same into the desired position for engaging the work and the platform 31 may then be adjusted to the proper position under the work and upon the operation of the crank 24 the platform will be raised for hoisting purposes. By reason of the worm and worm gear construction the platform will be maintained in its adjusted position without the necessity of employing stops or other devices to prevent gravitating action of the platform.

It is believed the details of construction, operation and advantages of the device will be readily understood from the foregoing without further detailed explanation.

Having thus described the invention, what I claim is—

1. A hoist comprising a pair of spaced parallel upstanding channel members having their channels arranged in opposed relation, said members having their lower ends bent outwardly for flatwise resting on the ground, a horizontal frame member connected to said outwardly bent ends and cooperating therewith to form a supporting base, a carrier slidably mounted in the channels of said channel members, a work-engaging platform projecting horizontally from said carrier and means connected to said carrier for raising and lowering the platform.

2. A hoisting jack of the character described comprising a pair of upstanding channel frame members having the channels thereof arranged in opposed relation, spacing members securing the channel members in spaced parallel relation, the lower ends of said channel members extending horizontally outwardly to provide supporting feet for the bottom of said channel members, a substantially U-shaped base having the end portions secured to the outer ends of said feet, braces extending from said base member to said channel members, wheels journalled on said base member and normally maintained out of ground-engaging position when the frame is supported in an upright position, said wheel members being adapted for engagement with the ground upon a tilting movement of said frame members and a work-engaging platform adjustably carried by said channel members.

OLAF EDWIN SANDSTROM.